A. RICHARD.
TOOL FOR USE IN WOODWORKING.
APPLICATION FILED SEPT. 1, 1921.
1,404,650.
Patented Jan. 24, 1922.
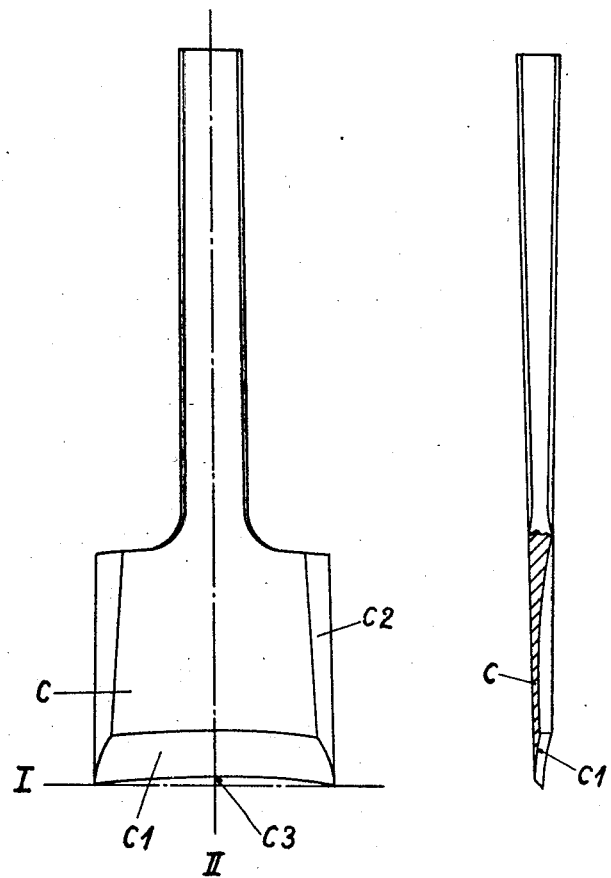
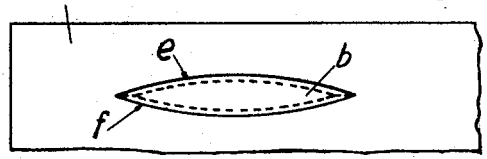 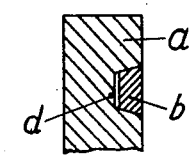
Inventor
A. Richard,
By Marks & Clerk
Attys.

UNITED STATES PATENT OFFICE.

ALFRED RICHARD, OF THALWIL, SWITZERLAND.

TOOL FOR USE IN WOODWORKING.

1,404,650.  Specification of Letters Patent.  Patented Jan. 24, 1922.

Application filed September 1, 1921. Serial No. 497,697.

*To all whom it may concern:*

Be it known that I, ALFRED RICHARD, a citizen of the Swiss Republic, residing at No. 10 Kirchbodenweg, Thalwil, Switzerland, have invented certain new and useful Improvements in Tools for Use in Woodworking, of which the following is a specification.

This invention has for its object to provide an improved tool for wood working, more particularly designed for repairing wooden articles by means of insets, especially for the purpose of filling up the cavities left by the removal of resinous pores, "shakes" and worm holes or other flaws in the wood.

In this improved tool the cutting end of a gouge or concave cutter is shaped in such a manner that the mere fact of placing the cutter upon the wood with its cutting end bearing upon the latter will ensure a determined inclined position of the cutter. This inclined position of the cutter is similar to the inclined cut to be made in the wooden article that is to be repaired and it is consequently also similar to the inclined surface to be given to the inset.

A constructional example of this invention is illustrated in the accompanying drawings in which:

Fig. 1 is an elevation of the improved tool;

Fig. 2 is a side elevation of the tool, partly in section, and

Fig. 3 is an end view of the said tool taken from the cutting end of same.

Fig. 4 is an elevation of a piece of wood after having been repaired, and

Fig. 5 is a section of same taken through the repaired place.

$c$ is the concave blade of the cutter, formed with a straight shank or handle to facilitate a convenient handling of the tool without increasing the weight of the tool unduly. The fundamental shape of the blade is that of an arc of a circle. The blade is formed at its cutting end with a hollow ground surface $c^1$ and at its two longitudinal sides with a straight ground surface $c^2$. The two longitudinal edges converge together very slightly towards the rear, that is to say, towards the shank or handle. The cutting edge of the blade $c$ is concave; the highest point $c^3$ of the concavity is situated in the longitudinal central plane II of the blade relatively to the straight line I that contacts the two sharp corners of the cutting edge of the blade.

For using the tool the blade is placed upon the surface of the wooden article $a$ (which is to be formed with a recess $d$ for receiving the inset $b$) in such a manner that it contacts the said surface with both its sharp corners, and with its centre $c^3$. Then the blade, that is to say the entire tool, has a determined inclined position relatively to the surface of the wood; the angle formed by the blade relatively to the surface of the wood being determined in accordance with the inclined cut to be made in the wooden article.

The desired inclined cut is produced by driving the blade in its inclined position into the wooden article $a$.

If the blade has first been placed, for instance, leftwise, it is then turned through 180 degrees into a rightwise position so that the recess will have imparted to it a fundamental shape which is composed of the two arcs $e$ and $f$ contacting each other at their ends, so that two sharp edges are formed. The two arcs $e$ and $f$ are then similar each to the fundamental shape of the blade.

The inset $b$ is cut in a similar manner from a sound piece of wood and is preferably glued into the wooden article $a$.

The improved tool facilitates considerably the repair of wooden articles, that is to say, is not dependent upon the skill of the workmen and does not require any auxiliary appliance (guiding device). A few sizes of the improved tool are sufficient to enable all ordinary flaws to be made good by repair.

The work is done neatly and the insets in the wooden article are practically invisible. Repairing can be done in the very shortest time.

What I claim is:—

1. In a tool for repairing wooden articles by means of insets, the combination of a hollow blade, the cutting edge of which is set back from both corners towards and up to the longitudinal central axis of the blade so that simply placing the blade on the wood with its cutting edge bearing upon the latter will automatically produce the correct inclined position of the blade relatively to the wood.

2. In a tool as specified in claim 1, the combination that the cutting edge of the blade is concave relatively to the two corners of the said cutting edge.

In testimony whereof I have signed my name to this specification.

ALFRED RICHARD.